(12) United States Patent
Grosselin et al.

(10) Patent No.: US 11,901,767 B2
(45) Date of Patent: Feb. 13, 2024

(54) COMPACTION PLATE, ASSOCIATED MAGNETIC MASS, STATOR, ROTOR, ROTATING ELECTRIC MACHINE AND DRIVING SYSTEM

(71) Applicant: GE Energy Power Conversion Technology Limited, Warwickshire (GB)

(72) Inventors: Christophe Grosselin, Champigneulles (FR); Lionel Durantay, Champigneulles (FR); Christophe Galmiche, Champigneulles (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 45 days.

(21) Appl. No.: 17/744,404

(22) Filed: May 13, 2022

(65) Prior Publication Data
US 2022/0368177 A1 Nov. 17, 2022

(30) Foreign Application Priority Data
May 14, 2021 (EP) .................................... 21305635

(51) Int. Cl.
| H02K 1/16 | (2006.01) |
| H02K 11/33 | (2016.01) |
| H02K 1/26 | (2006.01) |

(52) U.S. Cl.
CPC ............... *H02K 1/16* (2013.01); *H02K 1/26* (2013.01); *H02K 11/33* (2016.01)

(58) Field of Classification Search
CPC . H02K 1/16; H02K 1/26; H02K 11/30; H02K 11/33

USPC .................................................... 310/216.004
See application file for complete search history.

(56) References Cited

U.S. PATENT DOCUMENTS

| 3,659,129 | A | * | 4/1972 | Pettersen | ............... H02K 17/16 310/211 |
| 4,186,317 | A | | 1/1980 | Sisk | |
| 4,469,965 | A | | 9/1984 | Eckel | |
| 5,049,773 | A | | 9/1991 | Shinagawa et al. | |
| 6,364,635 | B1 | | 4/2002 | Goettel et al. | |
| 6,376,950 | B1 | | 4/2002 | Varney et al. | |
| 6,417,586 | B1 | | 7/2002 | Jarczynski et al. | |
| 6,452,294 | B1 | | 9/2002 | Vandervort et al. | |
| 6,661,145 | B1 | * | 12/2003 | Nilson | ................. H02K 1/2733 310/156.01 |
| 6,933,653 | B2 | * | 8/2005 | Fauth | ....................... H02K 1/28 310/261.1 |

(Continued)

FOREIGN PATENT DOCUMENTS

| DE | 2630023 A1 | 12/1977 |
| DE | 10156268 C1 | 12/2002 |

(Continued)

OTHER PUBLICATIONS

Extended European Search Report for EP Application No. 21305635.1 dated Nov. 4, 2021, 9 pages.

*Primary Examiner* — Rashad H Johnson
(74) *Attorney, Agent, or Firm* — WOOD IP LLC

(57) ABSTRACT

A compaction plate for magnetic mass is proposed.
The compaction plate comprises a plurality of laminated magnetic sheets, the laminated magnetic sheets being fixed together with fixing and electric insulating means.

14 Claims, 3 Drawing Sheets

(56) References Cited

U.S. PATENT DOCUMENTS

| | | |
|---|---|---|
| 7,861,404 B2 | 1/2011 | Fayewicz et al. |
| 9,293,958 B2 | 3/2016 | Ueno et al. |
| 9,621,011 B2 | 4/2017 | Wirsch, Jr. et al. |
| 2002/0074870 A1 | 6/2002 | Vandervort et al. |
| 2002/0074873 A1 | 6/2002 | Jarczynski et al. |
| 2004/0174087 A1 | 9/2004 | Heidrich |
| 2008/0092374 A1 | 4/2008 | Fayewicz et al. |
| 2013/0002060 A1 | 1/2013 | Moller et al. |
| 2018/0219455 A1 | 8/2018 | Goldstein et al. |
| 2021/0328488 A1* | 10/2021 | Takahashi ............ H02K 21/029 |
| 2021/0384782 A1* | 12/2021 | Tsuchiya .............. H02K 5/1735 |

FOREIGN PATENT DOCUMENTS

| | | |
|---|---|---|
| DE | 10014307 B4 | 11/2012 |
| EP | 0817355 A2 | 1/1998 |
| EP | 0817355 A3 | 4/1998 |
| EP | 1050890 A2 | 11/2000 |
| EP | 2451051 A2 | 5/2012 |
| EP | 3522334 A1 | 8/2019 |
| GB | 2114780 A | 8/1983 |
| JP | 0556584 A | 3/1993 |
| JP | 2010063253 A | 3/2010 |
| JP | 2010142038 A | 6/2010 |
| JP | 2010220340 A | 9/2010 |
| JP | 2014036485 A | 2/2014 |
| WO | 8908941 A1 | 9/1989 |
| WO | 9723938 A1 | 7/1997 |
| WO | 02050978 A2 | 6/2002 |
| WO | 2014089593 A1 | 6/2014 |
| WO | 2017060483 A1 | 4/2017 |

\* cited by examiner

COMPACTION PLATE, ASSOCIATED MAGNETIC MASS, STATOR, ROTOR, ROTATING ELECTRIC MACHINE AND DRIVING SYSTEM

TECHNICAL FIELD

The present invention concerns rotary electric machines and relates more particularly to a compaction plate for compacting laminated magnetic sheet of a magnetic mass.

The present invention also relates to a rotor and a stator comprising such a compaction plate, and a rotary electric machine comprising such a rotor and/or a stator.

BACKGROUND

Generally, a rotor or a stator for an electric machine comprises a magnetic mass made of a plurality of magnetic sheets compacted between two clamping plates connected by tie rods, each compaction plate being a massive plate with a central hole made of steel.

Under the effect of magnetic fields, currents are generated inside the clamping plates warming up the electric machine and deteriorating the performances of the electric machine.

As the performances of the machine is proportional to the length of the stack of magnetic sheets, the clamping plates do not contribute to the performances of the machine.

Further, as the compaction plates are made of steel, they increase the mass of the rotating electric machine, in particular the mass of a rotor comprising the clamping plates deteriorating the performances of the electric machine.

Further, a high frequency power supply signal of the rotating electric machine generates parasitic harmonics during the power conversion of the high frequency power supply signal by a variable frequency power signal.

The parasitic harmonics may also be generated by electromagnetic parts, for example rotor and/or stator slots, of the rotating electric machine supplied with a constant high frequency power supply signal.

The frequencies of the parasitic harmonics of the power supply signal may be for example frequencies more than a fundamental supply frequency equal to the pair of electric poles multiplied by the spinning frequency of the rotor.

The generated parasitic harmonics cause parasitic magnetic flux for example in the massive clamping plates in the rotor and the stator generating core losses and stary load losses warming up the rotor and the stator.

The warming up of the rotor and the stator deteriorate the efficiency of the rotating electric machine.

To minimize the effect of parasitic harmonics in the clamping plates electromagnetic shields are implemented at each end of the magnetic mass.

Electromagnetic shields are made of massive disks of copper or aluminum increasing the mass of the rotor or stator and deteriorating the performances of the electric machine.

Document JP2014036485 discloses a rotor comprising a laminated core formed by laminating magnetic thin plates and comprising a plurality of magnets arranged in holes of the laminated core. Each end of the laminated core comprises a resin molded plate fixing the magnets in each hole.

The resin molded plates do not warm up under the effect of a magnetic field.

However, the molded plates are not rigid enough to maintain the magnetic mass compacted.

It is known form the prior art to glue the laminated magnetic sheets in order to suppress the compaction plate.

As gluing the magnetic sheets is time consuming, it is adapted for small length magnetic mass, for example for electric machines less than 100 kW.

It is therefore proposed to remedy the disadvantages related to a magnetic mass comprising clamping plates according to the prior art, particularly for the magnetic mass incorporated in high power electric machine (more than 100 kW).

SUMMARY

In view of the foregoing the invention proposes a compaction plate for magnetic mass comprising a plurality of laminated magnetic sheets, the laminated magnetic sheets being fixed together with fixing and electric insulating means.

Each laminated magnetic sheet is formed by a plurality of segmented laminated magnetic sheets.

Advantageously, the fixing and electric insulating means comprise glue disposed between two adjacent laminated magnetic sheets.

Preferably, the fixing and electric insulating means comprise an electric insulating resin and at least one boss on each laminated magnetic sheet, each boss comprising a first face forming a cavity and a second face projecting from the magnetic sheet opposite the first face, the electric insulating resin being disposed between two adjacent laminated sheet, the first face of one laminated magnetic sheet being inserted into the second face of a first adjacent laminated magnetic sheet and the second face of the one laminated magnetic sheet being inserted into the first face of a second adjacent laminated magnetic sheet.

Advantageously, each laminated magnetic sheet comprises at least one tooth comprising notches intended to accommodate electrical windings.

According to still another aspect, a magnetic mass is proposed.

The magnetic mass comprises a plurality of laminated magnetic sheets compacted between two compaction elements, a first compaction element comprising a compaction plate as defined below, the compaction elements being connected by connecting means.

Advantageously, the second compaction element comprises a compaction plate as defined below.

Preferably, the connecting means comprise tie rods in the magnetic mass, the tie rods maintaining the laminated magnetic sheets compacted between the two compaction elements.

Advantageously, the connecting means comprise retaining bars maintaining the laminated magnetic sheets compacted between the two compaction elements.

Preferably, the magnetic mass comprises spacers arranged between two successive bundles of laminated magnetic sheets forming ventilation channels.

According to still another aspect, a rotor and a stator for an electric machine comprising a magnetic mass as defined below is proposed.

Another object of the invention relates to a driving system comprising a rotating electric machine as defined below and a power supply feeding the electric machine with a variable frequency power signal, for example with a high frequency power signal more than 100 Hz.

BRIEF DESCRIPTION OF THE DRAWINGS

Other characteristics and advantages of the invention will emerge on reading the following description of embodiments of the invention, provided solely by way of non-limiting examples and with reference to the drawings in which.

DETAILED DESCRIPTION

Figure 1:
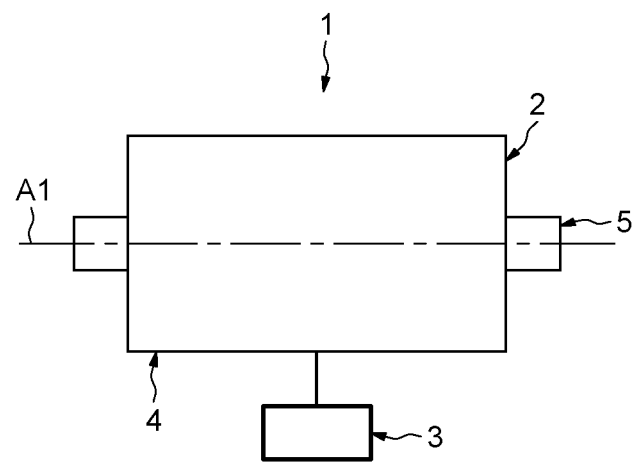
FIG. 1 illustrates an embodiment of a driving system.

FIG. 1 illustrates an embodiment of a driving system 1 comprising a rotating electric machine 2 and a power supply 3 feeding the rotating electric machine 2.

The rotating electric machine 2 comprises a stator 4 and a rotor 5 logged in the stator 4.

A1 is an axis of revolution of the rotor 5 in the stator 4.

The power of the rotating electric machine 2 is more than 100 KW, for example 1 MW.

When the rotating electric machine 2 operates in a motor mode generating mechanical power on the rotor 5, the power supply 3 may supply a high frequency power signal, the frequency being for example more than the spinning frequency of the rotor equal to the fundamental supply frequency divided by the pair of electric poles of the rotating electric machine 2.

In another embodiment, the power supply 3 may supply a variable frequency power signal.

In another embodiment, the rotating electric machine 2 operates in a generator mode generating electric power to the power supply 3, the power supply 3 being a reversible power supply.

Figure 2:
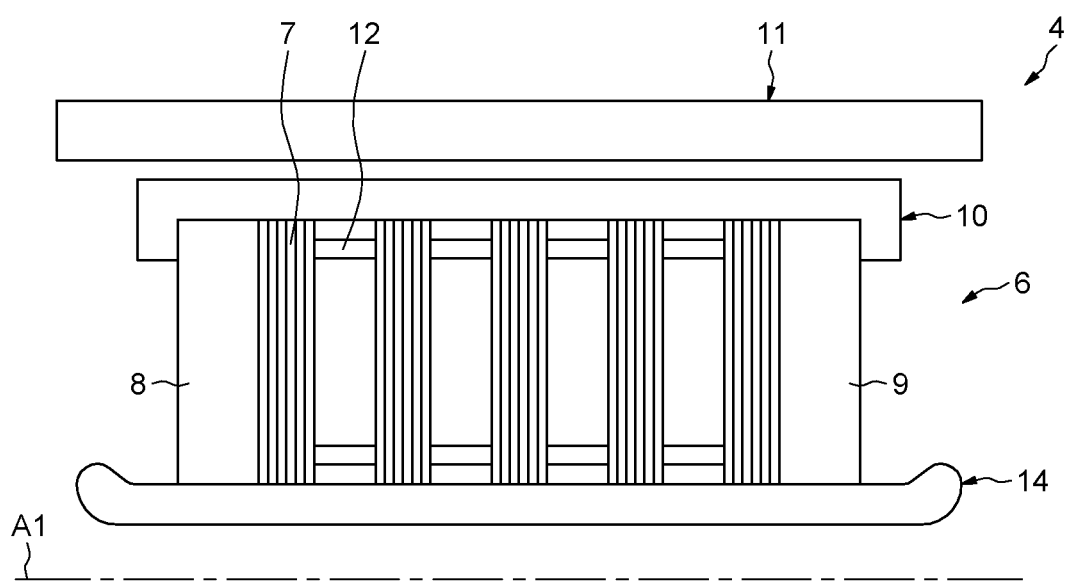
FIG. 2 illustrates a half-section of the cylindrical stator of a rotating electric machine.

FIG. 2 illustrates a half-section of the cylindrical stator 4 of the rotating electric machine 2.

The stator 4 is intended to receive the rotor 5 in its central space comprising an axis of revolution A1. The stator 4 includes a magnetic mass 6 comprising packs of laminated magnetic sheets 7 compressed between two compaction elements 8, 9 arranged on either side of the stator 4 and connected by connecting means comprising retaining bars 10 maintaining the laminated magnetic sheets compacted between the two compaction elements 8, 9, the retaining bars 10 being evenly distributed as represented here on an outer periphery of the laminated magnetic sheets 7, according to the axial direction A1, and a chassis 11 encompassing the magnetic mass 6.

It is assumed that the two compaction elements 8, 9 are identical.

In another embodiment, connecting means comprise tie rods evenly distributed on a diameter of the laminated magnetic sheets 7.

Two adjacent laminated magnetic sheets 7 may be separated by spacers 12 to create a ventilation channels as shown here.

In another embodiment, the magnetic mass 6 does not comprise spacers 12.

The stator 4 further comprises electrical windings 14.

Figure 3:
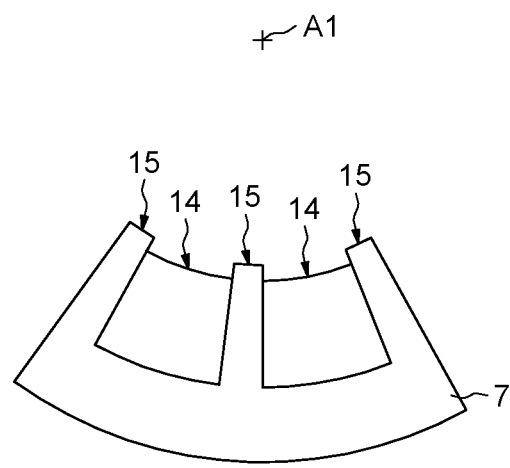
FIG. 3 illustrates a partial section of a laminated magnetic sheet.

FIG. 3 illustrates a partial section of a laminated magnetic sheet 7 accommodating electrical windings 14 generating magnetic flux.

The laminated magnetic sheet 7 comprises teeth 15 comprising notches accommodating the electrical windings 14.

Figure 4:
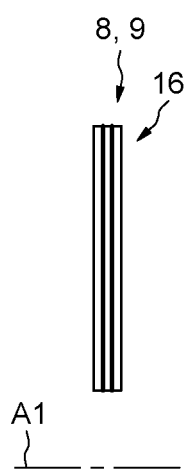
FIG. 4 illustrates a section of an embodiment of a compaction elements.
Figure 4:

FIG. 4 illustrates a section of an embodiment of the compaction elements 8, 9.

Each compaction element 8, 9 comprises a compaction plate 16 including a plurality of laminated magnetic sheets 7, the laminated magnetic sheets being fixed together with fixing and electric insulating means.

The laminated magnetic sheets 7 are made of magnetic steel.

The number of laminated magnetic sheets 7 forming the compaction plate 16 is chosen so that the compaction elements 8, 9 are rigid enough to maintain compacted the magnetic mass 6.

The fixing and electric insulating means comprise glue (represented in strong line) disposed between two adjacent laminated magnetic sheets 7, for example epoxy glue.

In another embodiment, the fixing and electric insulating means comprise varnish on a first side of first laminated magnetic sheet 7 and glue on a second side of a second laminated magnetic sheet 7, the first and second sides being in contact.

Figure 5:
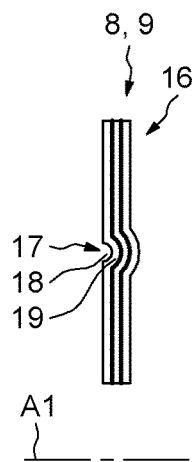
FIG. 5 illustrates a section of a second embodiment of a compaction plate.
Figure 5:
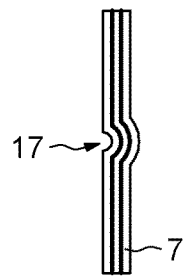

FIG. 5 illustrates a section of a second embodiment of the compaction plate 16 in which the fixing and electric insulating means comprise an electric insulating resin (strong line) and bosses 17.

Each laminated magnetic sheet 7 comprises at least one boss 17 comprising a first face 18 forming a cavity and a second face 19 projecting from the magnetic sheet opposite the first face.

The first face 18 of one laminated magnetic sheet 7 is inserted into the second face 19 of a first adjacent laminated magnetic sheet 7 and the second face 19 of the one laminated magnetic sheet 7 being inserted into the first face 18 of a second adjacent laminated magnetic sheet 7.

The electric insulating resin is disposed between two adjacent laminated sheet 7.

In another embodiment, the compaction elements 8, 9 are not identical, a first compaction element 8 comprises the compaction plate 16 and the second compaction element 9 comprises a clamping plate.

Figure 6:
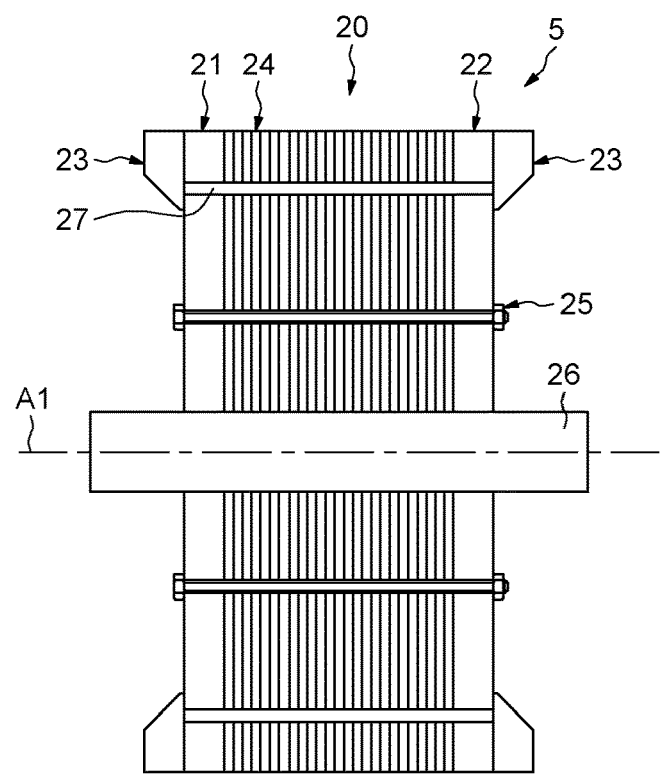
FIG. 6 illustrates an axial section of a rotor.

FIG. 6 illustrates an axial section of an embodiment of the rotor 5.

The rotor 6 comprises a cylindrical magnetic mass 20 clamped between two compaction elements 21, 22, short-circuit rings 23 in contact with the face of the compaction elements 21, 22 opposite to the face in contact with the magnetic mass 20.

In another embodiment, short-circuit rings 23 are replaced by short disks.

The magnetic mass 20 comprises packs of laminated magnetic sheets 24 compressed between the two compaction elements 21, 22 arranged on either side of the magnetic mass 20 and connected by connecting means comprising tie rods 25 maintaining the laminated magnetic sheets 24 compacted, the tie rods 25 being evenly distributed as represented here on an outer periphery of the laminated magnetic sheets 24, according to the axial direction A1.

In another embodiment, the connecting means comprises retaining bars evenly distributed on a diameter of the laminated magnetic sheets 24.

The magnetic mass 20, the compaction elements 21, 22 and the short-circuit rings 23 are crossed by a shaft 26.

Conductor bars 27 are housed in housings of the magnetic mass 20 and evenly distributed over a diameter of the magnetic mass 20 so that the shorting rings 23 and the conductor bars 27 form a squirrel cage.

The short-circuit rings 23 and the conductive bars 27 are made, for example, of copper or of alloyed copper.

The two compaction elements 21, 22 are identical, each comprising a compaction plate made of laminated magnetic sheets 24 fixed together with fixing and electric insulating means in the same way as explained bellow.

In another embodiment, a first compaction element 21 comprises the compaction plate and the second compaction element 22 comprises a clamping plate.

The rotating electric machine 2 implementing the rotor 5 is of the squirrel cage asynchronous type.

In another embodiment, the rotor 5 may comprise windings replacing the conductive bars 27, the windings and the short-circuit rings 23 forming a squirrel cage.

In another embodiment, the rotor 5 may comprise windings replacing the short-circuit rings 23 and the conductive bars 27 forming a winded rotor implemented in a synchronous rotating electric machine.

The removal and the replacement of the clamping plates by laminated magnetic sheets 24 permits to decrease the mass of the rotating electric machine 2 and to increase the active part generating magnetic flux of the magnetic mass 6, 20 improving the efficiency of the rotating electric machine 2 for example by improving the generated torque on the rotor 5 in motor mode, without increasing the volume of the magnetic mass 6, 20 and thus the volume of the rotating electric machine 2, or for example for defined characteristics of a rotating electric rotating electric machine, by reducing the mass and the volume of the machine.

Further, the removal and the replacement of the clamping plates by laminated magnetic sheets 24 permits to suppress the electromagnetic shields decreasing even more the mass of the rotating electric machine 2, for example the magnetic mass of the rotor to improve even more the torque generated by the rotating electric machine in motor mode and without warming up the rotor and/or the stator with parasitic harmonics so that the rotating electric machine 2 is even more efficient for example by improving the generated torque on the rotor 5 in motor or generator modes.

In another embodiment, each laminated magnetic sheet 7, 24 is formed by a plurality of segmented laminated magnetic sheets.

The invention claimed is:

1. A compaction plate for a magnetic mass, the compaction plate comprising a plurality of laminated magnetic sheets; being fixed together with a fixing and electric insulating means comprising an electric insulating resin and at least one boss on each laminated magnetic sheet, each boss comprising a first face forming a cavity and a second face projecting from the laminated magnetic sheet opposite the first face, the electric insulating resin being disposed between two adjacent laminated sheets, a first face of one laminated magnetic sheet being inserted into a second face of a first adjacent laminated magnetic sheet and the second face of the one laminated magnetic sheet being inserted into the first face of a second adjacent laminated magnetic sheet.

2. The compaction plate according to claim 1, wherein each laminated magnetic sheet of the plurality of laminated magnetic sheets is formed by a plurality of segmented laminated magnetic sheets.

3. The compaction plate according to claim 1, wherein the fixing and electric insulating means comprise a glue disposed between two adjacent laminated magnetic sheets.

4. The compaction plate according to claim 1, wherein each laminated magnetic sheet of the plurality of laminated magnetic sheets comprises at least one tooth comprising a plurality of notches intended to accommodate electrical windings.

5. A magnetic mass comprising a plurality of laminated magnetic sheets compacted between two compaction elements, a first compaction element of the two compaction elements comprising a compaction plate according to claim 1, the two compaction elements being connected by connecting means.

6. The magnetic mass according to claim 5, wherein a second compaction element of the two compaction elements comprises a compaction plate that comprises a plurality of laminated magnetic sheets, the plurality of laminated magnetic sheets being fixed together with the fixing and electric insulating means.

7. The magnetic mass according to claim 5, wherein the connecting means comprise tie rods in the magnetic mass, the tie rods maintaining the plurality of laminated magnetic sheets compacted between the two compaction elements.

8. The magnetic mass according to claim 5, wherein the connecting means comprise retaining bars maintaining the plurality of laminated magnetic sheets compacted between the two compaction elements.

9. The magnetic mass according to claim 5, comprising spacers arranged between two successive bundles of laminated magnetic sheets forming ventilation channels.

10. A rotor for an electric machine comprising a magnetic mass according to claim 5.

11. A rotating electric machine comprising a rotor according to claim 10.

12. A driving system comprising a rotating electric machine according to claim 11 and a power supply feeding the electric machine with a variable frequency power signal.

13. A stator for an electric machine comprising a magnetic mass according to claim 5.

14. A rotating electric machine comprising a stator according to claim 13.

* * * * *